United States Patent [19]

Rathert et al.

[11] Patent Number: 4,524,857

[45] Date of Patent: Jun. 25, 1985

[54] BOOK BLOCK FEED DEVICE

[75] Inventors: Horst Rathert, Minden; Winfried Hedrich, Rahden, both of Fed. Rep. of Germany

[73] Assignee: Rahdener Maschinenfabrik August Kolbus, Rahden, Fed. Rep. of Germany

[21] Appl. No.: 538,748

[22] Filed: Oct. 3, 1983

[30] Foreign Application Priority Data

Oct. 8, 1982 [DE] Fed. Rep. of Germany ....... 3237256

[51] Int. Cl.³ ............................................. B65G 25/00
[52] U.S. Cl. .................................... 198/409; 412/16; 198/488; 271/269; 271/225
[58] Field of Search ............... 198/488, 486, 409, 490, 198/774; 412/16, 37; 271/84, 267, 269, 225, 184, 185; 270/54

[56] References Cited

U.S. PATENT DOCUMENTS 3,093,396  6/1963  Segreto .................................. 412/16
3,179,967  4/1965  Yohn et al. ........................... 412/16
3,605,981  9/1971  Danieli ................................. 198/774

FOREIGN PATENT DOCUMENTS 51147174  6/1978  Japan ................................... 198/488

Primary Examiner—Joseph E. Valenza
Assistant Examiner—Kyle E. Shane

[57] ABSTRACT

Book blocks are transferred between vertically displaced levels via a first conveying path which extends upwardly at an angle, the conveying path being intercepted by a movable feed table which engages the book blocks and re-orients the motion thereof into a generally horizontal plane wherein the blocks are engaged by block clamps. The upstream edge of the feed table is caused to move along a closed generally circulatory path which extends above and below the inclined conveying path while the downstream edge of the feed table is constrained to move along an arcuate path which extends from the upper end of the first conveying path to a path which is parallel to that of the block clamps.

13 Claims, 3 Drawing Figures

BOOK BLOCK FEED DEVICE

BACKGROUND OF THE INVENTION

1. Field of the Invention

The present invention relates to the transfer of previously aligned abutting articles between work stations without disrupting the alignment and particularly to the feeding of book blocks to a binding machine. More specifically, this invention is directed to devices for transferring pre-aligned multi-layer articles, book blocks for example, between work stations located at two different vertical levels while maintaining the alignment of the layers. Accordingly, the general objects of the present invention are to provide novel and improved methods and apparatus of such character.

2. Description of the Prior Art

While not limited thereto in its utility, the present invention is particularly well-suited for feeding book blocks along an upwardly inclined transfer path to the block clamps of a binding machine, particularly a machine for securing the layers together by means of an adhesive or adhesively coated tape. A book block is comprised of a plurality of loose layers or sheets and, prior to binding, these sheets are brought into alignment. In a book manufacturing machine the book blocks must be transferred along an upwardly inclined path to a plane wherein they will be engaged by the block clamps of the binding apparatus. Prior art devices for feeding book blocks along the inclined path to the block clamps have proven to be unsatisfactory since they have subjected the blocks to a tilting force which has resulted in the relative displacement of the prealigned loose block components. Accordingly, it is standard practice in the prior art to subject the book blocks to a further aligning operation subsequent to their transfer to the level at which they are engaged by the block clamps. This aligning operation downstream of the transfer to the block clamp level occurs on what is known in the art as the "jogging path" of the binding machine. The necessity of providing such a "jogging path" significantly increases the cost of the book making apparatus since it necessitates the addition of at least two sets of block clamps on both the introduction and opposite sides of the conveying system.

SUMMARY OF THE INVENTION

The present invention overcomes the above-briefly discussed and other deficiencies of the prior art by providing a novel technique for the transfer of book blocks along an upwardly inclined path while maintaining the alignment of the layers or sheets which comprise the block. The present invention also encompasses feed apparatus for accomplishing this novel method and particularly apparatus for transferring book blocks from a conveying path, which defines an upwardly inclined plane, into the block clamps of a binding machine.

Apparatus in accordance with the present invention comprises a movable feed table which cooperates with a conveyor system, the conveyor system defining the upwardly inclined plane of movement of the book blocks, in such a manner as to intercept the book blocks in the conveying plane. The movements of the feed table are synchronized with those of the block clamps. The rearwardly disposed edge of the feed table is moved about a generally circulatory path and, when a book block is engaged thereby, the feed table lifts the rear edge thereof out of the conveying plane and upwardly into a plane where the book blocks may be engaged by the block clamps. Simultaneously, the forward edge of the feed table is caused to move along a path which initially follows the original inclined conveying path but subsequent merges into a path which is parallel to the path of motion of the block clamps. In the preferred embodiment the path of movement of the front edge of the feed table extends in an arc from the inclined conveying path to the generally horizontal conveying plane of the binding machine.

The movable feed table of the present invention reliably prevents the layers or sheets comprising the book block from being relatively displaced inside the block when it is transferred to the block clamps, even at high operational speeds since the book block is not subjected to any downward components of motion during the transfer operation. Accordingly, the "jogging path" previously required in binding machines for realigning the book block components can be eliminated and the overall length of the binding machine thereby substantially reduced. A particularly advantageous feature of the feed table of the present invention resides in the fact that the front edge of the table is guided along a path which has shallow curvature and thus the escape velocity of the book block from the feed table is low and the book block is not lifted as it is passed from the inclined conveying path into the binding machine conveying plane.

In accordance with the preferred embodiment the movements of the rear edge of the feed table are produced by a cam-controlled rocker which is retained in position on a drive wheel. At its upper limits of motion, as a result of the cam-controlled rocker cooperating with a control bar, the rear edge of the table is caused to depart from its circulatory path and follow a substantially horizontal course. This results in a flatening of the circulatory motion path of the rear edge of the feed table and the establishment of a horizontal transfer zone at the level where the book blocks will be engaged by the block clamps.

Also in accordance with the preferred embodiment of the present invention, the feed table is in the form of a lifting rake. The tines of this rake, during upward movement, pass between the arms of a fork-shaped member which defines the downstream end of the inclined conveying plane. Accordingly, as the tines of the feed table pass through the spaces between the arms of the conveying plane defining member they will engage and lift the trailing edge of the book block upwardly away from the inclined conveying plane.

The preferred embodiment of the present invention further includes a locating stop at the upstream end of the feed table. This locating stop will engage an edge of the book block thus assuring that the layers remain in alignment while the book block is in contact with the feed table.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENT

Figure 1:
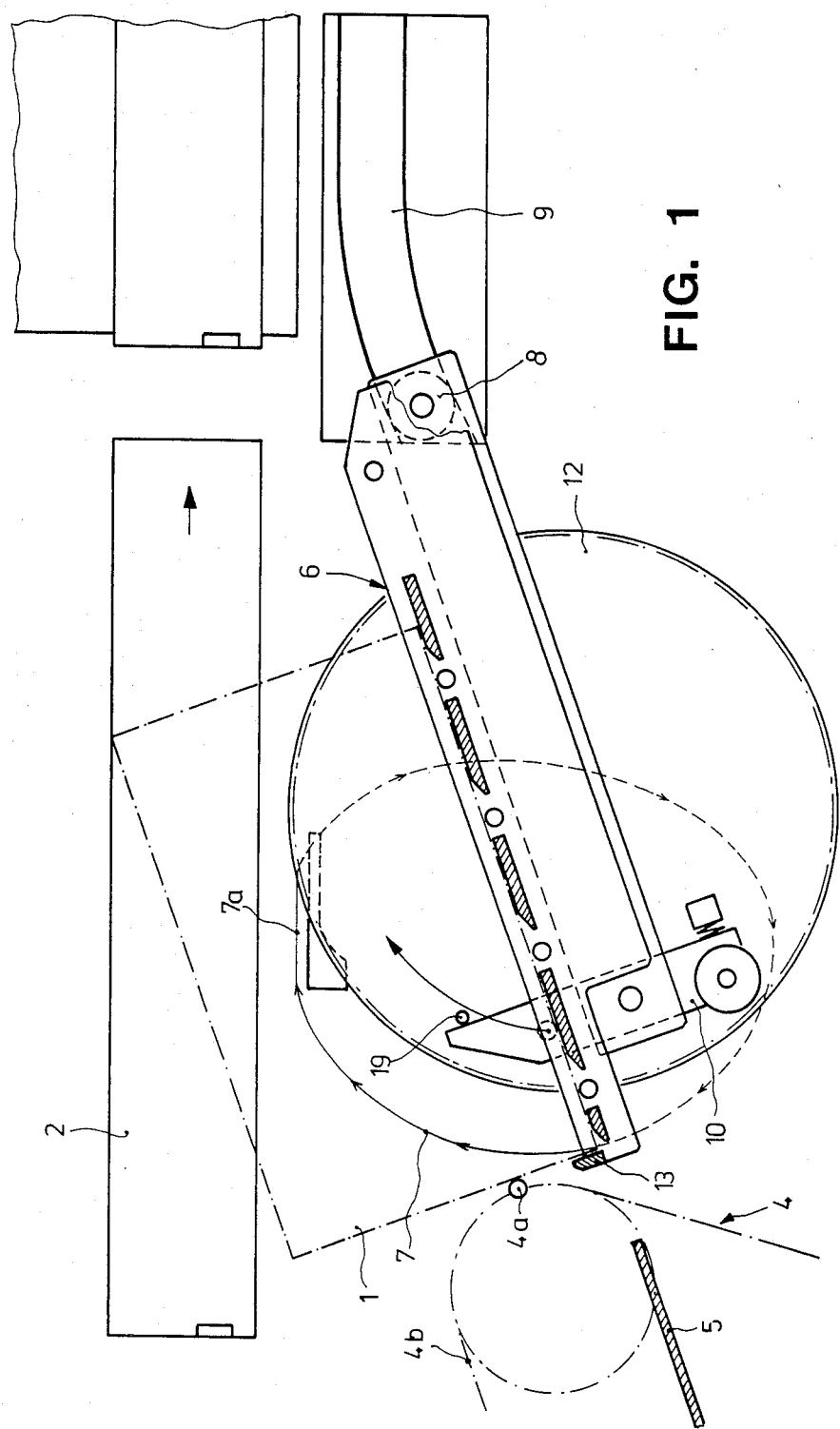
FIG. 1 is a schematic side elevation view, partly in section, of a feed device in accordance with the present invention in the book block receiving position.
Figure 2:
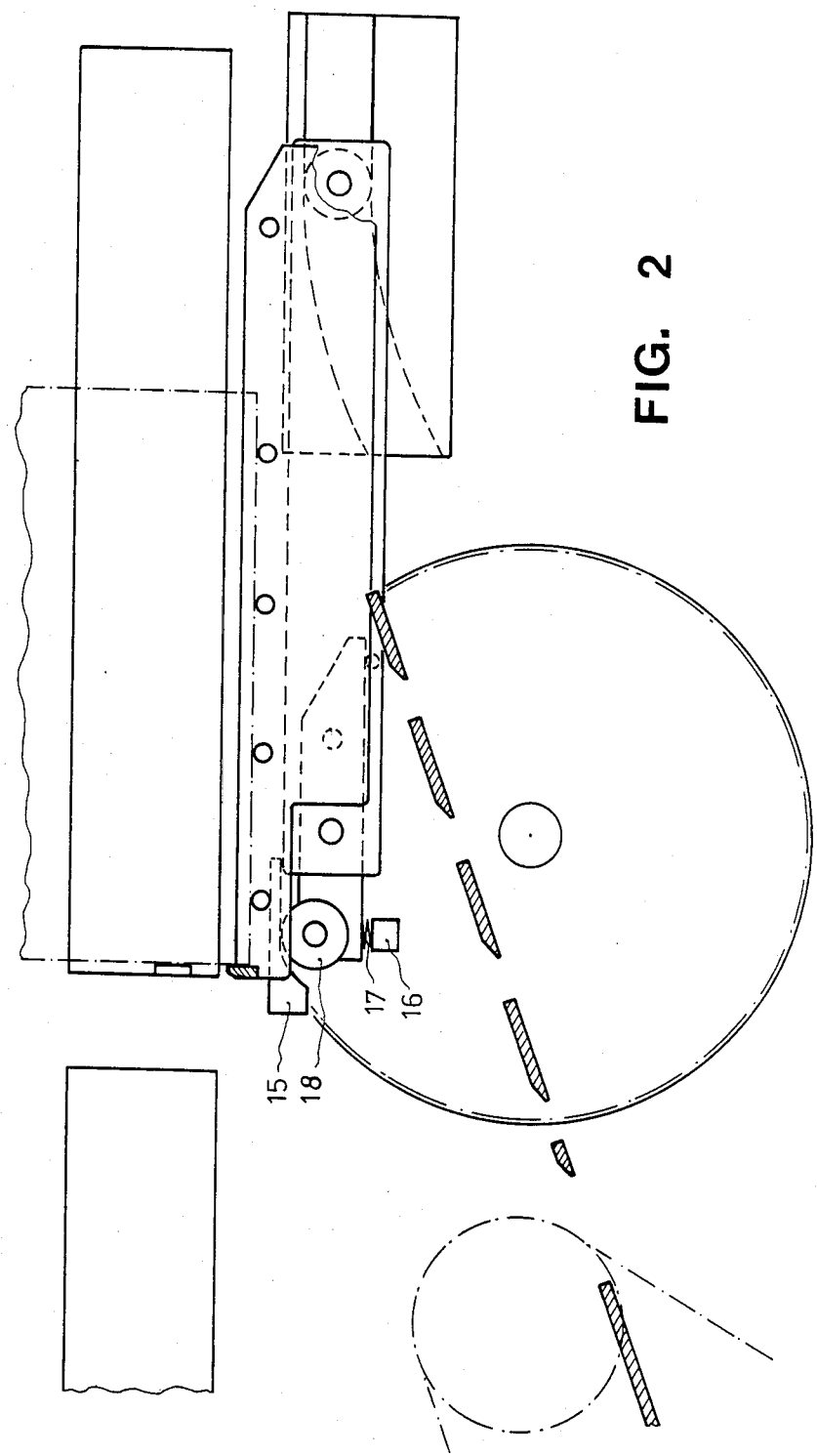
FIG. 2 is a view similar to FIG. 1 with the feed device shown in the transfer position.
Figure 3:
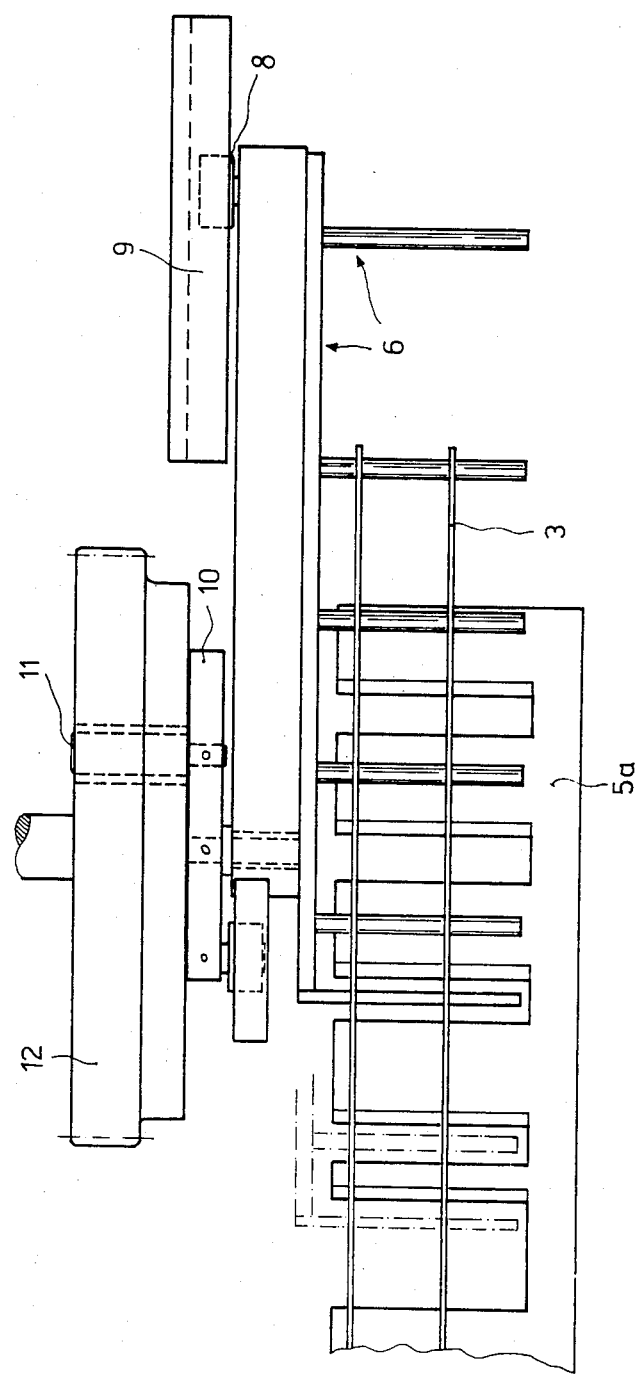
FIG. 3 is a plan view of the feed device of FIG. 1 and FIG. 2.

With reference to the drawing, a feed device in accordance with the present invention is particularly well-suited for transferring book blocks, indicated in phantom at 1 in FIG. 1, into the block clamps 2 of a binding machine which may be a threadless book binding machine. The feed table of the present invention, indicated generally at 6, is positioned adjacent a conveyor mechanism 4 which includes an inclined plane defining ramp member 5. The book blocks, comprised of loose book layers, are conveyed along the inclined plane in the forward direction and in an upright position. During movement the backs of the book blocks rest on the plane defining member 5 and are retained in an upright position by lateral limiting means 3 (FIG. 3). The movement of the book blocks along member 5 results from the pushing action of rod conveyors 4a of a conveying chain 4b. The conveying mechanism causes the book blocks to move up the inclined plane to the position indicated in FIG. 1 where they can be intercepted by the feed table 6.

The feed table 6 is in the form of a lifting rake having tines which contact and support a book block during the transfer motion to be described below. The tines of the feed table, as may be seen from FIG. 3, pass between the arms of a forked end portion 5a of the inclined plane defining ramp member 5.

The rear edge of feed table 6 is caused to follow a generally circulatory path, indicated at 7 on FIG. 1, with the feed table movement being synchronized with the continuously operating book block clamps 2. As the rear edge of the feed table moves along path 7 it will engage and move the trailing edge of a book block out of the upwardly extending conveying plane and carry the block into the conveying plane of the binding machine The book blocks will be engaged by the block clamps 2 at the upper limit of motion of table 6 whereupon the rear edge of the table will continue along path 7 and thus move downwardly, rearwardly and then again upwardly to intercept the inclined plane. The front edge of feed table 6 is constrained to move forwardly and backwardly along an arcuate path which defines a smooth transition from the inclined plane to the generally horizontal binding machine conveying plane.

In order to accomplish the above-briefly described movements, the front edge of table 6 is supported from a roller 8 which engages an arcuate track 9. The coopertion between roller 8 and track 9 forces the front edge of table 6 to follow the above described forward and backward arcuate movement as the rear edge of the table is driven to follow path 7. The rear edge of table 6 is connected to a rocker mechanism 10 which engages, via a drive shaft 11 (FIG. 3), a gear wheel 12 which is continuously driven from the main drive of the book binding apparatus. The rocker mechanism 10 is retained on one side by a stop 16, with the interposition of a compression spring 17, and on its opposite side by a stop pin 19 which extends from gear wheel 12.

As should be obvious to those skilled in the art, the means for producing the generally circulatory motion path of the rear edge of table 6 may be other than that disclosed. By way of example, a cam controlled rocker may be employed in combination with a planetary gear.

Continuing with a discussion of the disclosed embodiment, the apparatus is designed such that the feed table 6 is moving upwardly at a relatively rapid rate when it impacts a book block 1 and moves the trailing edge thereof away from the inclined plane of the conveyor. The feed table 6 is provided with a stop 13 at its rearwardly disposed edge, the stop extending upwardly transverse to the inclined plane at the point where the table 6 intercepts the book block. There will, because of the rapid movement of the feed table and the presence of stop 13, be an impinging and aligning effect of the layers of the book block.

In order to produce a horizontal transfer zone, wherein the block clamps 2 close on the book blocks, the circulatory path 7a of the rear edge of the table 6 is caused to flatten in a zone 7a, the path portion 7a being generally parallel to the binding machine conveyor path. In order to constrain the motion of the rear edge of table 6, and thus also the motion of the book block 1, to the flattened portion 7a, a stationery control bar or cam 15 is provided. A control roller or cam 18 affixed to the rocker mechanism 10 will engage control bar 15 and be held against this bar by the action of the compression spring 17.

The geometry of the path 7, 7a of the rear edge of table 6 and the forward and backward path, defined by track 9, of the forward edge of table 6 is such that, during the transfer movement, there is no downward component of velocity imposed on the book block. Displacements inside the book block are, due in part to the lateral frictional forces at the limiting means 3, rendered impossible.

When a book block has been transferred to the block clamps 2, the feed table 6 will move over its circulatory path back into the starting position where it lifts the next succeeding book block out of the inclined plane.

It is to be understood that the invention is not limited to the embodiment described and shown herein, which is deemed to be illustrative of the best mode of carrying out the invention, and which is susceptible to modification of form, size, arrangement of parts and details of operation. The invention rather is intended to encompass all such modifications which are within its spirit and scope as defined by the claims.

What is claimed is:

1. Apparatus for transferring blocks comprised of plural articles, the articles being aligned within the blocks, from a lower to a higher level without disruption of the alignment, said apparatus comprising:

first conveyor means, said first conveyor means defining a motion path for the blocks which is generally inclined upwardly;

movable clamp means, said clamp means defining a second motion path for the blocks, said clamp means receiving and engaging the blocks;

feed table means, said table means having first and second edges and defining a plane therebetween;

means for imparting motion to said feed table means, said motion imparting means causing a first edge of said feed table means to follow a generally closed path, said closed path intercepting said upwardly inclined motion path whereby a block will be engaged by said table means first edge and will be raised from said inclined motion path, said closed path extending above and below said inclined motion path, the upper limit of motion of said feed table means first edge placing a block engaged by said feed table means in registration with said clamp means whereby said clamp means may engage the block and continue the motion thereof; and means for guiding the motion of the second edge of said feed table means, said second edge being disposed oppositely with respect to said first edge and being located downstream of said first edge in the direction of motion of a block along said inclined motion path, said guide means causing said feed table means second edge to move from said inclined motion path to a path which follows the course of said second motion path.

2. The apparatus of claim 1 wherein the blocks are book blocks, said clamp means carry the book blocks to a binding machine and wherein said motion imparting means is synchronized with said clamp means.

3. The apparatus of claim 2 wherein said guiding means constrains the motion of said feed table means second edge to an arcuate path.

4. The apparatus of claim 3 wherein the binding machine includes a conveying plane which is generally parallel to the path of motion defined by said clamp means and wherein said guiding means arcuate path extends from said inclined motion path to the binding machine conveying plane.

5. The apparatus of claim 3 wherein said motion imparting means comprises:
a drive wheel;
rocker means, said rocker means being mounted on said drive wheel and being movable relative thereto, said rocker means including a cam follower, said rocker means being connected to said feed table means whereby said table means first edge is caused to follow a circulatory path; and
stationery cam means, said rocker means cam follower contacting said cam means in an upper zone of said circulatory motion path, said cam means defining a table means motion zone which is generally parallel to said second motion path whereby said circulator path of said feed table means is flattened in the region where said clamp means engages the block.

6. The apparatus of claim 4 wherein said motion imparting means comprises:
a drive wheel;
rocker means, said rocker means being mounted on said drive wheel and being movable relative thereto, said rocker means including a cam follower, said rocker means being connected to said feed table means whereby said table means first edge is caused to follow a circulatory path; and
stationery cam means, said rocker means cam follower contacting said cam means in an upper zone of said circulatory motion path, said cam means defining a table means motion zone which is generally parallel to said second motion path whereby said circulatory path of said feed table means is flattened in the region where said clamp means engages the block.

7. The apparatus of claim 1 wherein said feed table means comprises a base member having a plurality of fingers extending outwardly therefrom and wherein said first conveyor means is provided with openings through which said feed table means fingers may pass.

8. The apparatus of claim 5 wherein said feed table means comprises a base member having a plurality of fingers extending outwardly therefrom and wherein said first conveyor means is provided with openings through which said feed table means fingers may pass.

9. The apparatus of claim 6 wherein said feed table means comprises a base member having a plurality of fingers extending outwardly therefrom and wherein said first conveyor means is provided with openings through which said feed table means fingers may pass.

10. The apparatus of claim 1 wherein said feed table means comprises an upwardly extending stop at said first edge thereof, said stop contacting an edge of a block intercepted by said feed table means and insuring alignment of the plural articles comprising said block.

11. The apparatus of claim 7 wherein said feed table means further comprises an upwardly extending stop at said first edge thereof, said stop contacting an edge of a block intercepted by said feed table means and insuring alignment of the plural articles comprising said block.

12. The apparatus of claim 8 wherein said feed table means further comprises an upwardly extending stop at said first edge thereof, said stop contacting an edge of a block intercepted by said feed table means and insuring alignment of the plural articles comprising said block.

13. The apparatus of claim 9 wherein said feed table means further comprises an upwardly extending stop at said first edge thereof, said stop contacting an edge of a block intercepted by said feed table means and insuring alignment of the plural articles comprising said block.

* * * * *